United States Patent
Welton et al.

(10) Patent No.: US 10,838,960 B2
(45) Date of Patent: *Nov. 17, 2020

(54) DATA ANALYTICS PLATFORM OVER PARALLEL DATABASES AND DISTRIBUTED FILE SYSTEMS

(71) Applicant: EMC IP Holding Company LLC, Hopkinton, MA (US)

(72) Inventors: Caleb E. Welton, Foster City, CA (US); Shengwen Yang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/821,361

(22) Filed: Nov. 22, 2017

(65) Prior Publication Data

US 2018/0373755 A1 Dec. 27, 2018

Related U.S. Application Data

(63) Continuation of application No. 15/389,321, filed on Dec. 22, 2016, now Pat. No. 9,858,315, which is a
(Continued)

(51) Int. Cl.
*G06F 16/24* (2019.01)
*G06F 16/2453* (2019.01)
(Continued)

(52) U.S. Cl.
CPC ........ *G06F 16/24542* (2019.01); *G06F 16/10* (2019.01); *G06F 16/11* (2019.01);
(Continued)

(58) Field of Classification Search
CPC ......... G06F 17/30445; G06F 17/30067; G06F 17/3007; G06F 17/30106; G06F 17/30194;
(Continued)

(56) References Cited

U.S. PATENT DOCUMENTS 5,933,422 A    8/1999 Kusano
6,957,222 B1 * 10/2005 Ramesh ............ G06F 17/30466
(Continued)

FOREIGN PATENT DOCUMENTS

CN      102033889 A     4/2011
WO      WO2012050582    4/2012
WO      WO-2012124178 A1 9/2012

OTHER PUBLICATIONS

Brad Hedlund, "Understanding Hadoop Clusters and the Network", Bradhedlund.com, 2011, pp. 1-22. Available at http://bradhedlund.com/2011/09/10/understanding-hadoop-clusters-and-the-network/.

*Primary Examiner* — Kris E Mackes
*Assistant Examiner* — Tiffany Thuy Bui
(74) *Attorney, Agent, or Firm* — Van Pelt, Yi & James LLP

(57) ABSTRACT

Performing data analytics processing in the context of a large scale distributed system that includes a massively parallel processing (MPP) database and a distributed storage layer is disclosed. In various embodiments, a data analytics request is received. A plan is created to generate a response to the request. A corresponding portion of the plan is assigned to each of a plurality of distributed processing segments, including by invoking as indicated in the assignment one or more data analytical functions embedded in the processing segment.

18 Claims, 5 Drawing Sheets

US 10,838,960 B2
Page 2

Related U.S. Application Data continuation of application No. 13/840,912, filed on Mar. 15, 2013, now Pat. No. 9,563,648.

(60) Provisional application No. 61/769,043, filed on Feb. 25, 2013.

(51) Int. Cl.
*G06F 16/10* (2019.01)
*G06F 16/11* (2019.01)
*G06F 16/27* (2019.01)
*G06F 16/14* (2019.01)
*G06F 16/182* (2019.01)
*G06F 16/907* (2019.01)
*G06F 16/18* (2019.01)
*G06F 16/2455* (2019.01)
*G06F 16/2458* (2019.01)
*G06F 16/2452* (2019.01)
*H04L 29/08* (2006.01)
*H04L 29/06* (2006.01)
*G06F 16/43* (2019.01)
*G06F 16/21* (2019.01)
*G06F 16/245* (2019.01)

(52) U.S. Cl.
CPC .......... *G06F 16/148* (2019.01); *G06F 16/182* (2019.01); *G06F 16/1858* (2019.01); *G06F 16/2453* (2019.01); *G06F 16/2455* (2019.01); *G06F 16/2471* (2019.01); *G06F 16/24524* (2019.01); *G06F 16/24532* (2019.01); *G06F 16/27* (2019.01); *G06F 16/907* (2019.01); *H04L 65/60* (2013.01); *H04L 67/1097* (2013.01); *H05K 999/99* (2013.01); *G06F 16/113* (2019.01); *G06F 16/217* (2019.01); *G06F 16/245* (2019.01); *G06F 16/43* (2019.01)

(58) Field of Classification Search
CPC ......... G06F 17/30224; G06F 17/30283; G06F 17/30433; G06F 17/30442; G06F 17/30463; G06F 17/30477; G06F 17/30545; G06F 17/30997; G06F 17/30023; G06F 17/30073; G06F 17/30306; G06F 17/30424; G06F 16/24542; G06F 16/2471; G06F 16/27; G06F 16/907; G06F 16/182; G06F 16/148; G06F 16/2455; G06F 16/24524; G06F 16/1858; G06F 16/2453; G06F 16/24532; G06F 16/10; G06F 16/11; G06F 16/217; G06F 16/245; G06F 16/113; H04L 65/60; H04L 67/1097
See application file for complete search history.

(56) References Cited

U.S. PATENT DOCUMENTS

| | | |
|---|---|---|
| 7,599,969 B2 | 10/2009 | Mignet |
| 7,653,665 B1 | 1/2010 | Stefani |
| 7,702,676 B2 | 4/2010 | Brown |
| 7,743,051 B1 | 6/2010 | Kashyap |
| 7,885,953 B2 | 2/2011 | Chen |
| 7,906,259 B2 | 3/2011 | Hayashi |
| 7,908,242 B1* | 3/2011 | Achanta ............ G06F 17/30442 707/602 |
| 7,921,130 B2 | 4/2011 | Hinshaw |
| 7,984,043 B1* | 7/2011 | Waas ................. G06F 16/8358 707/718 |
| 8,171,018 B2 | 5/2012 | Zane |
| 8,266,122 B1 | 9/2012 | Newcombe |
| 8,359,305 B1* | 1/2013 | Burke ............... G06F 16/90348 707/706 |
| 8,572,051 B1 | 10/2013 | Chen |
| 8,645,356 B2 | 2/2014 | Bossman |
| 8,713,038 B2 | 4/2014 | Cohen |
| 8,805,870 B2 | 8/2014 | Chen |
| 8,868,546 B2 | 10/2014 | Beerbower |
| 8,935,232 B2 | 1/2015 | Abadi |
| 8,990,335 B2 | 3/2015 | Fauser |
| 9,110,706 B2* | 8/2015 | Yu ............................. G06F 8/456 |
| 9,235,396 B2* | 1/2016 | Ke ............................. G06F 8/453 |
| 9,626,411 B1* | 4/2017 | Chang ................ G06F 16/2471 |
| 9,639,575 B2* | 5/2017 | Leida ................ G06F 17/30427 |
| 2003/0037048 A1 | 2/2003 | Kabra |
| 2003/0212668 A1 | 11/2003 | Hinshaw et al. |
| 2004/0030739 A1 | 2/2004 | Yousefi'zadeh |
| 2004/0073549 A1 | 4/2004 | Turkel |
| 2004/0095526 A1 | 5/2004 | Yamabuchi |
| 2004/0186842 A1 | 9/2004 | Wesemann |
| 2005/0289098 A1 | 12/2005 | Barsness |
| 2006/0224563 A1* | 10/2006 | Hanson ............ G06F 16/24542 |
| 2007/0050328 A1 | 3/2007 | Li |
| 2008/0059489 A1 | 3/2008 | Han |
| 2008/0082644 A1* | 4/2008 | Isard ........................ G06F 9/5066 709/223 |
| 2008/0086442 A1 | 4/2008 | Dasdan |
| 2008/0120314 A1 | 5/2008 | Yang |
| 2008/0195577 A1 | 8/2008 | Fan |
| 2008/0222090 A1 | 9/2008 | Sasaki |
| 2008/0244585 A1 | 10/2008 | Candea |
| 2009/0043745 A1 | 2/2009 | Barsness |
| 2009/0182792 A1 | 7/2009 | Bomma |
| 2009/0216709 A1 | 8/2009 | Cheng |
| 2009/0234850 A1 | 9/2009 | Kocsis |
| 2009/0254916 A1 | 10/2009 | Bose |
| 2009/0271385 A1 | 10/2009 | Krishnamoorthy |
| 2009/0292668 A1* | 11/2009 | Xu ..................... G06F 17/30498 |
| 2010/0088298 A1* | 4/2010 | Xu ..................... G06F 17/30498 707/705 |
| 2010/0114970 A1* | 5/2010 | Marin ................ G06F 17/30864 707/802 |
| 2010/0198806 A1 | 8/2010 | Graefe |
| 2010/0198807 A1 | 8/2010 | Kuno |
| 2010/0198808 A1 | 8/2010 | Graefe |
| 2010/0198809 A1 | 8/2010 | Graefe |
| 2010/0223305 A1 | 9/2010 | Park |
| 2010/0241827 A1 | 9/2010 | Yu |
| 2010/0241828 A1* | 9/2010 | Yu ............................. G06F 8/456 712/30 |
| 2010/0257198 A1 | 10/2010 | Cohen |
| 2010/0332458 A1 | 12/2010 | Xu |
| 2011/0047172 A1 | 2/2011 | Chen |
| 2011/0131198 A1 | 6/2011 | Johnson |
| 2011/0138123 A1 | 6/2011 | Gurajada |
| 2011/0228668 A1 | 9/2011 | Pillai |
| 2011/0231389 A1 | 9/2011 | Surna |
| 2011/0246511 A1 | 10/2011 | Smith |
| 2011/0302164 A1 | 12/2011 | Krishnamurthy |
| 2012/0036146 A1 | 2/2012 | Annapragada |
| 2012/0078973 A1* | 3/2012 | Gerdes .................... G06F 16/27 707/802 |
| 2012/0191699 A1 | 7/2012 | George |
| 2012/0259894 A1 | 10/2012 | Varley |
| 2013/0030692 A1 | 1/2013 | Hagan |
| 2013/0031139 A1* | 1/2013 | Chen ................. G06F 17/30415 707/802 |
| 2013/0054630 A1 | 2/2013 | Briggs |
| 2013/0117237 A1 | 5/2013 | Thomsen |
| 2013/0138612 A1 | 5/2013 | Iyer |
| 2013/0166523 A1 | 6/2013 | Pathak |
| 2013/0173716 A1 | 7/2013 | Rogers |
| 2013/0346988 A1 | 12/2013 | Bruno |
| 2014/0019683 A1 | 1/2014 | Ishikawa |
| 2014/0067792 A1 | 3/2014 | Erdogan |
| 2014/0095526 A1 | 4/2014 | Harada |
| 2014/0108459 A1 | 4/2014 | Gaza |
| 2014/0108861 A1 | 4/2014 | Abadi |
| 2014/0122542 A1 | 5/2014 | Barnes |
| 2014/0136590 A1 | 5/2014 | Marty |

(56) References Cited

U.S. PATENT DOCUMENTS

| | | |
|---|---|---|
| 2014/0149355 A1 | 5/2014 | Gupta |
| 2014/0149357 A1 | 5/2014 | Gupta |
| 2014/0188841 A1* | 7/2014 | Sun .................. G06F 16/24553 |
| | | 707/718 |
| 2014/0188884 A1* | 7/2014 | Morris .............. G06F 17/30289 |
| | | 707/738 |
| 2014/0195558 A1 | 7/2014 | Murthy |
| 2014/0201565 A1 | 7/2014 | Candea |

* cited by examiner

DATA ANALYTICS PLATFORM OVER PARALLEL DATABASES AND DISTRIBUTED FILE SYSTEMS

CROSS REFERENCE TO OTHER APPLICATIONS

This application is a continuation of co-pending U.S. patent application Ser. No. 15/389,321, entitled DATA ANALYTICS PLATFORM OVER PARALLEL DATABASES AND DISTRIBUTED FILE SYSTEMS filed Dec. 22, 2016 which is incorporated herein by reference for all purposes, which is a continuation of U.S. patent application Ser. No. 13/840,912, entitled DATA ANALYTICS PLATFORM OVER PARALLEL DATABASES AND DISTRIBUTED FILE SYSTEMS filed Mar. 15, 2013, now U.S. Pat. No. 9,563,648, which is incorporated herein by reference for all purposes, which claims priority to U.S. Provisional Application No. 61/769,043, entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

BACKGROUND OF THE INVENTION

Distributed storage systems enable databases, files, and other objects to be stored in a manner that distributes data across large clusters of commodity hardware. For example, Hadoop® is an open-source software framework to distribute data and associated computing (e.g., execution of application tasks) across large clusters of commodity hardware.

EMC Greenplum® provides a massively parallel processing (MPP) architecture for data storage and analysis. Typically, data is stored in segment servers, each of which stores and manages a portion of the overall data set. Advanced MPP database systems such as EMC Greenplum® provide the ability to perform data analytics processing on huge data sets, including by enabling users to use familiar and/or industry standard languages and protocols, such as SQL, to specify data analytics and/or other processing to be performed. Examples of data analytics processing include, without limitation, Logistic Regression, Multinomial Logistic Regression, K-means clustering, Association Rules based market basket analysis, Latent Dirichlet based topic modeling, etc.

While distributed storage systems, such as Hadoop®, provide the ability to reliable store huge amounts of data on commodity hardware, such systems have not to date been optimized to support data mining and analytics processing with respect to the data stored in them.

BRIEF DESCRIPTION OF THE DRAWINGS

Various embodiments of the invention are disclosed in the following detailed description and the accompanying drawings.

DETAILED DESCRIPTION

Figure 1:
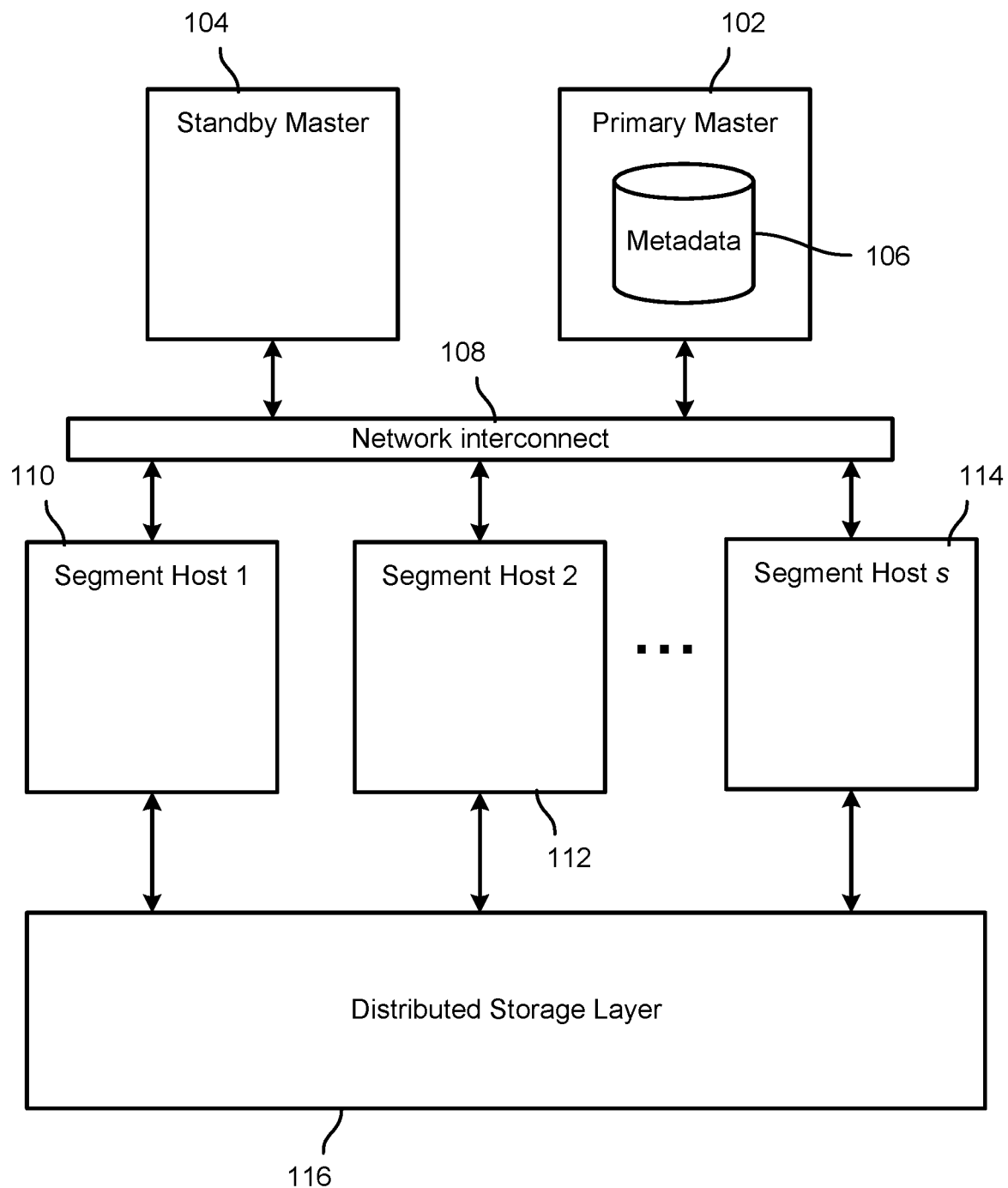
FIG. 1 is a block diagram illustrating an embodiment of a large scale distributed system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing advanced data analytics capabilities in the context of a large distributed data storage system is disclosed. In various embodiments, a massively parallel processing (MPP) database system is adapted to manage and provide data analytics with respect to data stored in a large distributed storage layer, e.g., an implementation of the Hadoop® distributed storage framework. Examples of data analytics processing include, without limitation, Logistic Regression, Multinomial Logistic Regression, K-means clustering, Association Rules based market basket analysis, Latent Dirichlet based topic modeling, etc. In some embodiments, advanced data analytics functions, such as statistical and other analytics functions, are embedded in each of a plurality of segment servers comprising the MPP database portion of the system. In some embodiments, to perform a data analytics task, such as computing statistics, performing an optimization, etc., a master node selects a subset of segments to perform associated processing, and sends to each segment an indication of the data analytics processing to be performed by that segment, including for example an identification of the embedded data analytics function(s) to be used, and associated metadata required to locate and/or access the subset of data on which that segment is to perform the indicated processing.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in distributed storage layer 116, e.g., a Hadoop® or other storage layer.

When the master node 102 accepts a query, it is parsed and planned according to the statistics of the tables in the query, e.g., based on metadata 106. After the planning phase, a query plan is generated. A query plan is sliced into many slices. In the query execution phase, for each slice a group of segments, typically comprising a subset of the segments hosted on segment hosts 1 through s, is selected to execute the slice. In various embodiments, the size of the group may be dynamically determined by using the knowledge of the data distribution and available resources, e.g., workload on respective segments, etc.

In various embodiments, a data analytics job or other query may be expressed in whole or in part using SQL and/or any other specified language or syntax. A master node, such as primary master 102, parses the SQL or other input and invokes scripts or other code available on the master to perform top level processing to perform the requested processing. In various embodiments, a query plan generated by the master 102, for example, may identify for each of a plurality of segments a corresponding portion of the global data set to be processed by that segment. Metadata identifying the location of the data to be processed by a particular segment, e.g., with distributed storage layer 116, is sent to the segment by the master 102. In various embodiments, the distributed storage layer 116 comprises data stored in an instance of the Hadoop Distributed File System (HDFS) and the metadata indicates a location within the HDFS of data to be processed by that segment. The master 102 in addition will indicate to the segment the specific processing to be performed. In various embodiments, the indication from the master may indicate, directly or indirectly, one or more analytics functions embedded at each segment which is/are to be used by the segment to perform the required processing.

Figure 2:
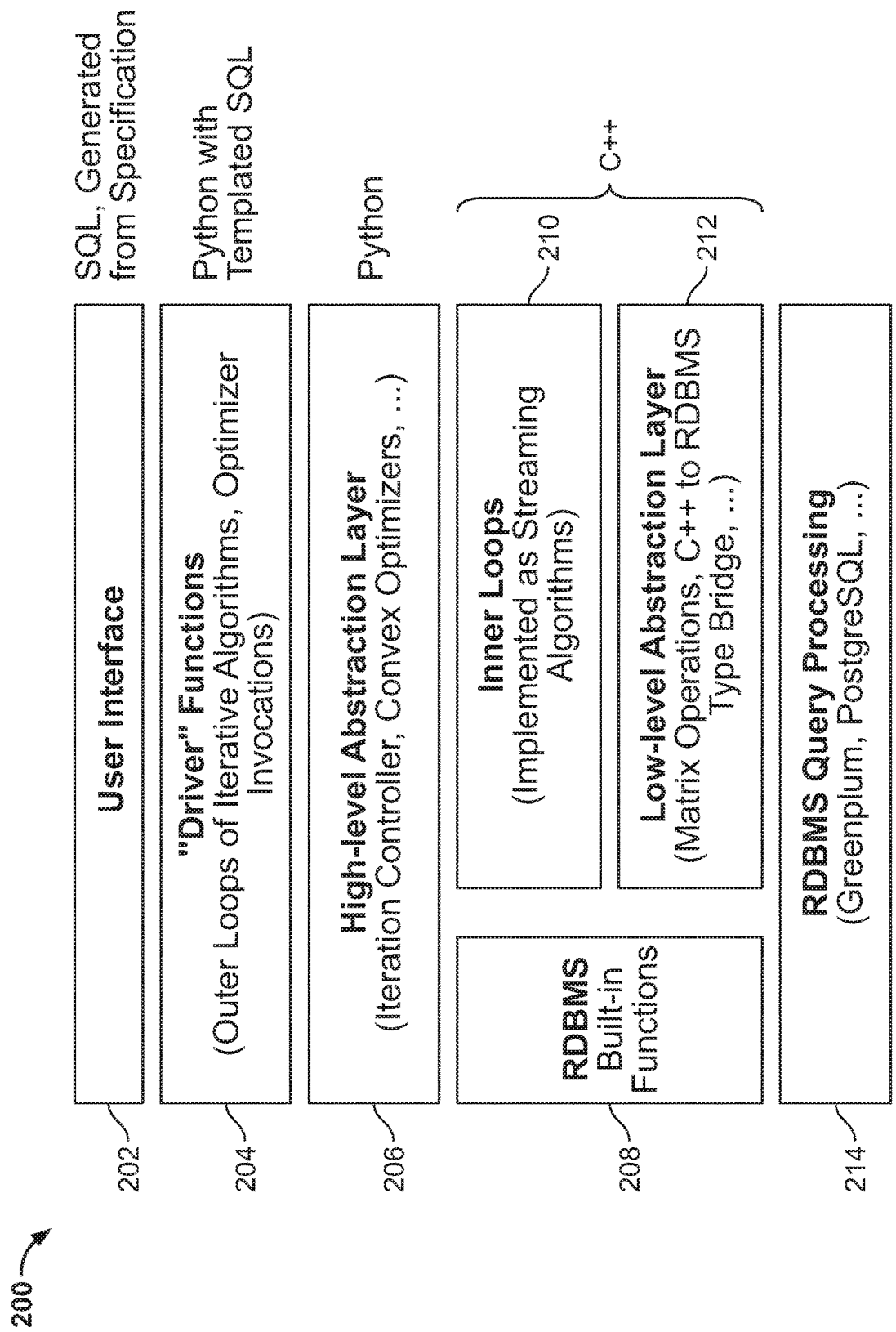
FIG. 2 is a block diagram illustrating an embodiment of a data analytics architecture of a large scale distributed system.

FIG. 2 is a block diagram illustrating an embodiment of a data analytics architecture of a large scale distributed system. In various embodiments, the data analytics architecture 200 of FIG. 2 is implemented in a large scale distributed system, such as the large scale distribute system of FIG. 1. In the example shown, the data analytics architecture 200 includes a user interface 202 that enables data analytics requests to be expressed using SQL, e.g., as indicated by a specification. Various driver functions 204, e.g., python or other scripts with templated SQL in this example, may be invoked to perform, for example, the outer loops of iterative algorithms, optimizer invocations, etc. A high level abstraction layer 206, in this example also comprising python scripts, provides functionality such as an iteration controller, convex optimizers, etc. The upper layers 202, 204, and 206 interact with RDBMS built-in functions 208 and/or with inner loops 210 and/or low-level abstraction layer 212, comprising compiled C++ in this example, to perform lower level tasks required to perform a task received via user interface 202. Data is accessed to perform analytics computations and/or other processing by interacting with an underlying RDBMS query processing layer 214. In various embodiments, one or more of the components shown in FIG. 2 may be implemented across nodes comprising the system, such as across the segments or other processing units comprising the MPP database portion of a large scale distributed system such as the one shown in FIG. 1. In various embodiments, core data analytics processing is performed at least in part using functions embedded in each of the segments (or other processing units) included in the system. In some embodiments, the functions comprise a "shared object" or library of functions comprising compiled C++ or other compiled code, such as Java or Fortran. As a portion of a broader task is assigned to a segment, the segment uses the embedded function(s) implicated by the assignment to perform at least part the data analytics and/or other processing that has been assigned to the segment.

Figure 3:
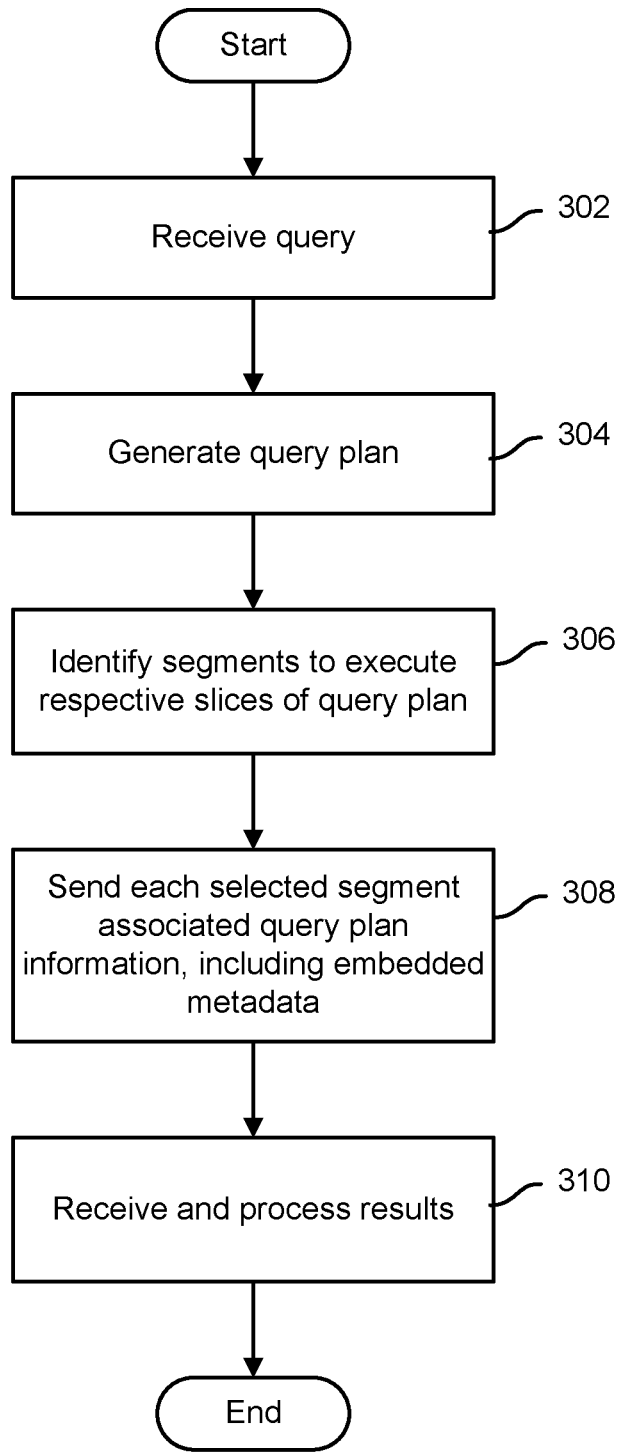
FIG. 3 is a flow chart illustrating an embodiment of a database query processing process.

FIG. 3 is a flow chart illustrating an embodiment of a database query processing process. In some embodiments, a master node, such as primary master 102 of FIG. 1, implements the process of FIG. 3. In the example shown, a query is received (302). Examples of a query include, without limitation, an advanced data analytics request expressed in whole or in part as a set of SQL statements. A query plan is generated (304). The plan is divided into a plurality of slices, and for each slice a corresponding set of segments ("gang") is identified to participate in execution of that slice of the query plan (306). For each slice of the query plan, the segments selected to perform processing required by that slice are sent a communication that includes both the applicable portion of the plan to be performed by that segment and metadata that may be required by a receiving segment to perform tasks assigned to that segment (308). In some embodiments, the metadata included in the query plan slice and/or other communication sent to the respective segments selected to participate in execution of that slice of the plan includes metadata from a central metadata store, e.g., metadata 106 of FIG. 1, and includes information indicating to the segment the location of data with respect to which that segment is to perform query plan slice related processing. In past approaches, typically a segment would store and manage a corresponding portion of the overall data, and sending metadata to perform query plan related tasks would not typically have been necessary. In some embodiments, metadata and/or other data included in assignments sent to selected segments may indicate data analytics processing to be performed, in whole or in part, by the segment using one or more data analytics functions that have been embedded in each of the segments in the distributed system. Query results are received from the respective segments to which query tasks were dispatched, and processed to generate, e.g., at the master node, a master or overall response to the query (310).

Figure 4:
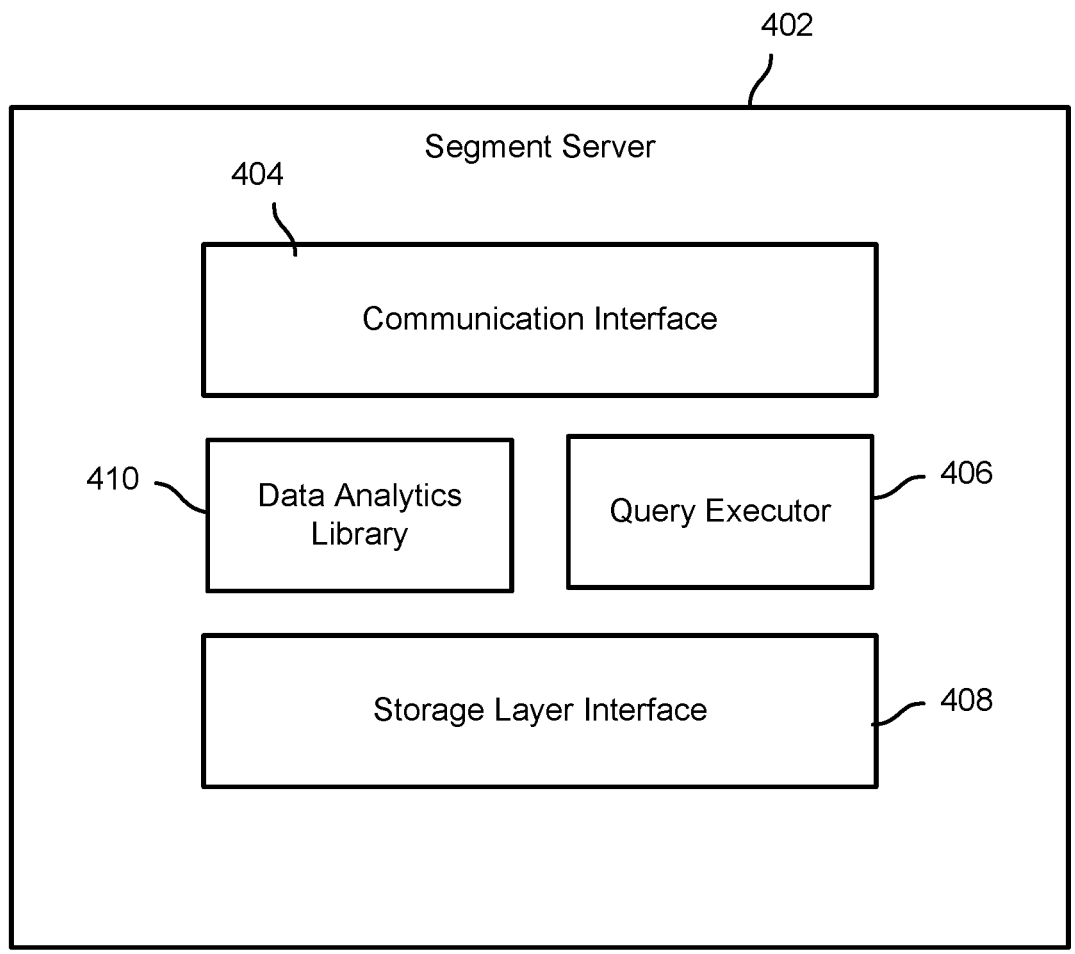
FIG. 4 is a block diagram illustrating an embodiment of a segment server.

FIG. 4 is a block diagram illustrating an embodiment of a segment server. In various embodiments, one or more segment servers such as segment server 402 may be deployed in each of a plurality of segment hosts, such as segment hosts 110, 112, and 114 of FIG. 1. In the example shown, the segment server 402 includes a communication interface 404 configured to received, e.g., via a network interconnect such as interconnect 108 of FIG. 1, a network communication comprising an assignment sent by a master node such as primary master 102 of FIG. 1. A query executor 406 performs processing required to complete tasks assigned by the master node, using in this example a storage layer interface 408 to access data stored in a distributed storage layer, such as distributed storage layer 116 of FIG. 1. One or more data analytics functions included in a shared data analytics library 410 embedded in each segment server in the distributed system may be called to perform data analytics processing, as required to perform the assigned task. Examples of functions that may be embedded in segment servers in various embodiments include, without limitation: User-Defined Functions (e.g. a UDF which randomly initializes an array with values in a specified range, a UDF which transposes a matrix, a UDF which un-nests a 2-dimensional array into a set of 1-dimensional arrays, etc.), step functions, and final functions of various User-Defined Aggregators.

Figure 5:
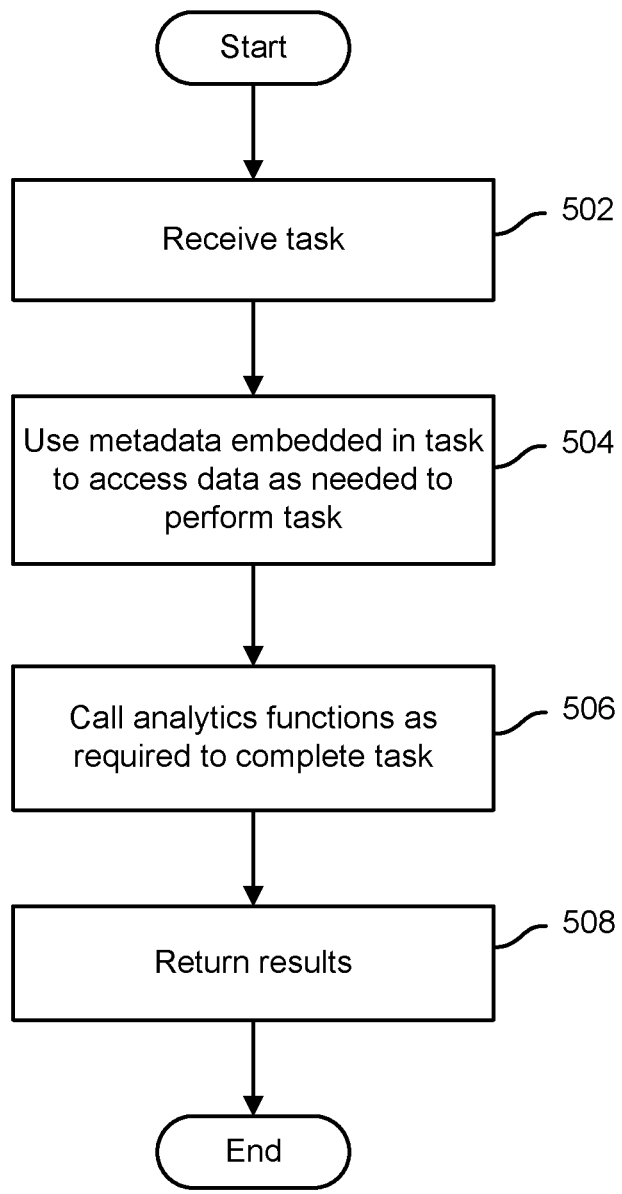
FIG. 5 is a flow chart illustrating an embodiment of a process to perform data analytics processing.

FIG. 5 is a flow chart illustrating an embodiment of a process to perform data analytics processing. In various embodiments, the process of FIG. 5 is performed by a segment server in response to receiving an assignment, e.g., from a master node, to perform an assigned part of a data analytics query plan. In the example shown, an assigned task is received (502). Metadata embedded in the assigned task is used to access data as needed to perform the assigned task(s) (504). Data analytics functions embedded at the segment server or other processing unit are invoked as needed to perform the assigned task (506). Examples of functions that may be embedded in segment servers in various embodiments include, without limitation: a function which does Gibbs sampling for the inference of Latent Dirichlet Allocation, or a function which generates the association rules. Once processing has been completed, a result is returned, for example to the master node from which the assignment was received (508).

Using techniques disclosed herein, a scalable and high-performance data analytics platform can be provided over a high-performance parallel database system built upon a scalable distributed file system. The advantages of parallel databases and distributed file systems are combined to overcome the challenges of big data analytics. Finally, in various embodiments, users are able to use familiar SQL queries to run analytic tasks, and the underlying parallel database engines translate these SQL queries into a set of execution plans, optimized according to data locality and load balances.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a master node, a query from a client node, the query being input according to one or more sets of Structured Query Language (SQL) statements;
creating, by the master node, a plan to process the query;
selecting, with respect to the plan, one or more selected processing segments from among a plurality of distributed processing segments and metadata associated with the plan to be used in connection with performing the plan, the one or more selected processing segments being selected to process a corresponding portion of the plan;
obtaining, by the master node, the metadata associated with the plan, the metadata being obtained from a central metadata store;
sending, by the master node, to each of the one or more selected processing segments, the corresponding portion of the plan to be processed by that corresponding processing segment and metadata associated with the plan, the metadata associated with the plan being sent in connection with the corresponding portion of the plan to be processed, wherein the metadata is used in connection with locating or accessing a subset of data on which the corresponding selected processing segment is to perform an indicated processing;
receiving, from at least one of the one or more selected processing segments, a result of the portion of the plan processed by the corresponding processing segment; and
generating, a master response to the query based at least in part on the result of the portion of the plan received from the at least one of the one or more selected processing segments,
wherein:
the creating the plan and selecting the one or more selected processing segments collectively comprise translating the query from the one or more SQL statements to the plan according to an optimization based on (i) data locality of data associated with the plan, and (ii) load balances among the plurality of distributed processing segments;
the metadata or corresponding portion of the plan sent to each of the plurality of distributed processing segments for which a portion of the plan is assigned includes an indication of one or more data analytics function to be used to process the portion of the plan; and
the one or more selected processing segments correspondingly invoke the one or more data analytical functions respectively embedded in the one or more selected processing segments.

2. The method of claim 1, wherein the metadata identifies a location data corresponding to one or more portions of the plan and at least a part of one or more data analytic processing to be performed in connection with processing the corresponding portion of the plan.

3. The method of claim 1, wherein a request to process the query comprises one or more SQL statements.

4. The method of claim 1, wherein a request to process the query comprises one or more SQL statements to compute one or more of the following: Logistic Regression, Multinomial Logistic Regression, K-means clustering, Association Rules based market basket analysis, and Latent Dirichlet based topic modeling.

5. The method of claim 1, wherein a request to process the query is received at the master node, wherein the master node corresponds to a master node of a large scale distributed system.

6. The method of claim 1, wherein the creating of the plan to process the query includes creating a query plan, slicing the query plan into a plurality of slices, and identifying for each slice a group of processing segments to perform tasks comprising that slice of the query plan.

7. The method of claim 1, wherein each of the selected one or more processing segments is configured to use the metadata to access the data to be processed by that segment.

8. The method of claim 1, wherein a request to process the query is received at the master node, wherein the master node corresponds to a master node of a large scale distributed system, and the large scale distributed system comprises a distributed data storage layer comprising data stored in an instance of a Hadoop Distributed File System (HDFS)

and the metadata indicates a location within the HDFS of data to be processed by the corresponding processing segment of the one or more selected processing segments.

9. The method of claim 1, further comprising: embedding in each of the plurality of distributed processing segments a library or other shared object comprising one or more data analytical functions, wherein the library or other shared object is included in the one or more selected processing segments as deployed.

10. The method of claim 9, wherein the library or other shared object embodies the one or more data analytical functions in a form of one or more of: compiled C++ code, compiled Java, compiled Fortran, or other compiled code.

11. The method of claim 1, wherein the plurality of distributed processing segments comprise a subset of parallel processing segments comprising a massively parallel processing (MPP) database system.

12. The method of claim 1, wherein the one or more data analytics function includes a User-Defined function, a step function, or a final function of a User-Defined Aggregator.

13. The method of claim 1, wherein the metadata sent to each of the one or more selected processing segments is sent in conjunction with the corresponding portion of the plan to be performed by that selected processing segment.

14. The method of claim 13, wherein the metadata sent to each of the one or more selected processing segments is sent as part of the corresponding portion of the plan to be performed by that selected processing segment.

15. The method of claim 1, wherein at least a portion of the metadata sent to each of the one or more selected processing segments is obtained from a central metadata store.

16. The method of claim 1, wherein the one or more selected processing segments are selected based at least in part on a data distribution and available processing resources, and a number of the one or more selected processing segments is dynamic in relation to received queries.

17. A system, comprising:
a communication interface; and
one or more processors coupled to the communication interface and configured to:
receive a query from a client node, the query being input according to one or more sets of Structured Query Language (SQL) statements;
create a plan to process the query;
select, with respect to the plan, one or more of selected processing segments from among a plurality of distributed processing segments and metadata associated with the plan to be used in connection with performing the plan, the one or more selected processing segments being selected to process a corresponding portion of the plan;
obtain the metadata associated with the plan, the metadata being obtained from a central metadata store;
send, to each of the one or more selected processing segments, the corresponding portion of the plan to be processed by that corresponding processing segment and metadata associated with the plan, the metadata associated with the plan being sent in connection with the corresponding portion of the plan to be processed, wherein the metadata is used in connection with locating or accessing a subset of data on which the corresponding selected processing segment is to perform an indicated processing;

receive, from at least one of the one or more selected processing segments, a result of the corresponding portion of the plan processed by the corresponding processing segment; and
generate, a master response to the query based at least in part on the result of the corresponding portion of the plan received from the at least one of the one or more selected processing segments,
wherein:
to create the plan and to select the one or more selected processing segments collectively comprise translating the query from the one or more SQL statements to the plan according to an optimization based on (i) data locality of data associated with the plan, and (ii) load balances among the plurality of distributed processing segments;
the metadata or corresponding portion of the plan sent to each of the plurality of distributed processing segments for which a portion of the plan is assigned includes an indication of one or more data analytics function to be used to process the portion of the plan; and
the one or more selected processing segments correspondingly invoke the one or more data analytical functions respectively embedded in the one or more selected processing segments.

18. A computer program product embodied in a tangible, non-transitory computer readable storage medium, comprising computer instructions for:
receiving, by a master node, a query from a client node, the query being input according to one or more sets of Structured Query Language (SQL) statements;
creating a plan to processing the query;
selecting, with respect to the plan, one or more selected processing segments from among a plurality of distributed processing segments and metadata associated with the plan to be used in connection with performing the plan, the one or more selected processing segments being selected to process a corresponding portion of the plan;
obtaining the metadata associated with the plan, the metadata being obtained from a central metadata store;
sending, to each of the one or more selected processing segments, the corresponding portion of the plan to be processed by that corresponding processing segment and metadata, the metadata associated with the plan being sent in connection with the corresponding portion of the plan to be processed, wherein the metadata is used in connection with locating or accessing a subset of data on which the corresponding selected processing segment is to perform an indicated processing;
receiving, from at least one of the one or more selected processing segments, a result of processing the corresponding portion of the plan; and
generating, a master response to the query based at least in part on the result of the corresponding portion of the plan received from the at least one of the one or more selected processing segments,
wherein:
the creating the plan and selecting the one or more selected processing segments collectively comprise translating the query from the one or more SQL statements to the plan according to an optimization based on (i) data locality of data associated with the plan, and (ii) load balances among the plurality of distributed processing segments;

the metadata or corresponding portion of the plan sent to each of the plurality of distributed processing segments for which a portion of the plan is assigned includes an indication of one or more data analytics function to be used to process the portion of the plan; and the one or more selected processing segments correspondingly invoke the one or more data analytical functions respectively embedded in the one or more selected processing segments.

\* \* \* \* \*